US012130013B2

(12) United States Patent
Vise et al.

(10) Patent No.: US 12,130,013 B2
(45) Date of Patent: Oct. 29, 2024

(54) SWIRLER-FERRULE ASSEMBLY

(71) Applicant: General Electric Company, Schenectady, NY (US)

(72) Inventors: Steven C. Vise, Loveland, OH (US); Clayton S. Cooper, Loveland, OH (US); Michael A. Benjamin, Cincinnati, OH (US); Pradeep Naik, Bengaluru (IN); Kwanwoo Kim, Cincinnati, OH (US); Shai Birmaher, Cincinnati, OH (US); Perumallu Vukanti, Bengaluru (IN); Saket Singh, Bengaluru (IN); Karthikeyan Sampath, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 144 days.

(21) Appl. No.: 17/396,155

(22) Filed: Aug. 6, 2021

(65) Prior Publication Data

US 2022/0412550 A1 Dec. 29, 2022

(30) Foreign Application Priority Data

Jun. 24, 2021 (IN) ............................ 202111028347

(51) Int. Cl.
*F23D 11/38* (2006.01)
*B05B 7/10* (2006.01)

(52) U.S. Cl.
CPC .............. *F23D 11/383* (2013.01); *B05B 7/10* (2013.01)

(58) Field of Classification Search
CPC ............... F23D 11/383; F23D 2209/30; F23D 2900/14241; B05B 7/10; B05B 1/3421; B05B 7/04; F23R 3/14; F23R 3/286; F23R 3/10; F23R 3/12; F23R 3/04
See application file for complete search history.

(56) References Cited

U.S. PATENT DOCUMENTS

| | | | | |
|---|---|---|---|---|
| 5,623,827 | A | 4/1997 | Monty | |
| 5,941,075 | A * | 8/1999 | Ansart | F23R 3/14 60/737 |
| 6,571,559 | B1 | 6/2003 | Fortuna et al. | |
| 6,834,505 | B2 | 12/2004 | Al-Roub et al. | |
| 7,013,649 | B2 | 3/2006 | Monty | |
| 7,334,410 | B2 * | 2/2008 | Creighton | F23R 3/14 60/748 |

(Continued)

*Primary Examiner* — Christopher R Dandridge
(74) *Attorney, Agent, or Firm* — Venable LLP; Peter T. Hrubiec; Michele V. Frank

(57) ABSTRACT

A swirler-ferrule assembly includes a radial swirler, a ferrule, a fuel nozzle, and a surface feature. The radial swirler includes a primary swirler vane having a primary air passage and a secondary swirler vane having a secondary air passage. The ferrule may be connected to the radial swirler. The surface feature may be located on the primary swirler vane and/or the ferrule. The surface feature may be configured to direct an air flow through the primary air passage away from a recirculation zone located upstream of the primary swirler vane. The surface feature has a trailing end and a distal end, and the fuel nozzle is axially aligned with the trailing end of the surface feature or is located axially downstream of the trailing end of the surface feature. The surface feature may have a plurality of grooves.

19 Claims, 11 Drawing Sheets

(56) References Cited

U.S. PATENT DOCUMENTS

| | | | | |
|---|---|---|---|---|
| 7,891,190 | B2 | 2/2011 | Commaret et al. | |
| 9,303,876 | B2 | 4/2016 | Hernandez et al. | |
| 10,180,256 | B2 | 1/2019 | Rullaud et al. | |
| 2005/0044854 | A1 * | 3/2005 | Cazalens ................. | F23R 3/286 60/740 |
| 2008/0000234 | A1 * | 1/2008 | Commaret ............ | F23D 11/107 60/748 |
| 2016/0377293 | A1 | 12/2016 | Short et al. | |
| 2018/0172275 | A1 | 6/2018 | Prociw et al. | |
| 2019/0086088 | A1 | 3/2019 | Stevens et al. | |

* cited by examiner

SWIRLER-FERRULE ASSEMBLY

CROSS REFERENCE TO RELATED APPLICATIONS

The present application claims priority to Indian Patent Application No. 202111028347, filed Jun. 24, 2021, which is hereby incorporated by reference in its entirety.

TECHNICAL FIELD

The present disclosure relates to a swirler for an engine. More particularly, the present disclosure relates to a swirler-ferrule assembly.

BACKGROUND

A combustor of an engine may include a swirler and a ferrule for centering a fuel nozzle within the swirler. The swirler and the ferrule may introduce an air flow to the combustor for mixing with a fuel flow from the fuel nozzle. The swirler may be a radial swirler. The swirler may include a primary swirler vane and a secondary swirler vane. The primary swirler vane may include a primary air passage and the secondary swirler vane may include a secondary swirler passage. Air may flow through each of the primary swirler passage, the secondary swirler passage, and a purge air passage through the ferrule. The air flows may mix with the fuel flow through the fuel nozzle. The fuel to air mixture may be provided to a combustor.

BRIEF SUMMARY

According to an embodiment, a swirler-ferrule assembly includes a radial swirler including: (a) a primary swirler vane having a primary air passage; and (b) a secondary swirler vane having a secondary air passage, a fuel nozzle configured to deliver fuel to a combustor, a ferrule connected to the radial swirler, the ferrule configured to center the fuel nozzle in the radial swirler. and a surface feature having a trailing end and a distal end, the surface feature being located on the primary swirler vane and configured to direct an air flow through the primary air passage away from a recirculation zone located upstream of the primary swirler vane. The fuel nozzle is axially aligned with the trailing end of the surface feature or is located axially downstream of the trailing end of the surface feature.

According to an embodiment, a swirler-ferrule assembly includes a radial swirler including: (a) a primary swirler vane having a primary air passage; and (b) a secondary swirler vane having a secondary air passage, a fuel nozzle configured to deliver fuel to a combustor, a ferrule connected to the radial swirler, the ferrule configured to center the fuel nozzle in the radial swirler, and a surface feature comprising a plurality of grooves, the surface feature being located on the radial swirler or the ferrule and configured to direct a primary air flow through the primary air passage away from a recirculation zone located upstream of the primary swirler vane.

Additional features, advantages, and embodiments of the present disclosure are set forth or apparent from a consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

The swirler-ferrule assemblies of the present disclosure may reduce the interaction of the ferrule air flow with the primary swirler vane air flow by providing surface features within the swirler and/or the ferrule. This may reduce flow instabilities inside the swirler. Additionally, the surface features may limit or prevent a fuel-air mixture flow into a low velocity region formed between the primary swirler forward face inner diameter and the ferrule plate, thus, reducing the risk of auto-ignition and flame holding. The surface feature may include a curved surface on the primary swirler vane that may guide the air flow. The surface feature may include a plurality of grooves on the primary swirler vane and/or the ferrule that may guide the air flow. The fuel nozzle may be located at least aligned with a trailing edge of the surface feature or may be located downstream of a trailing edge of the surface feature so as to eliminate a recirculation zone within the swirler.

Figure 1:
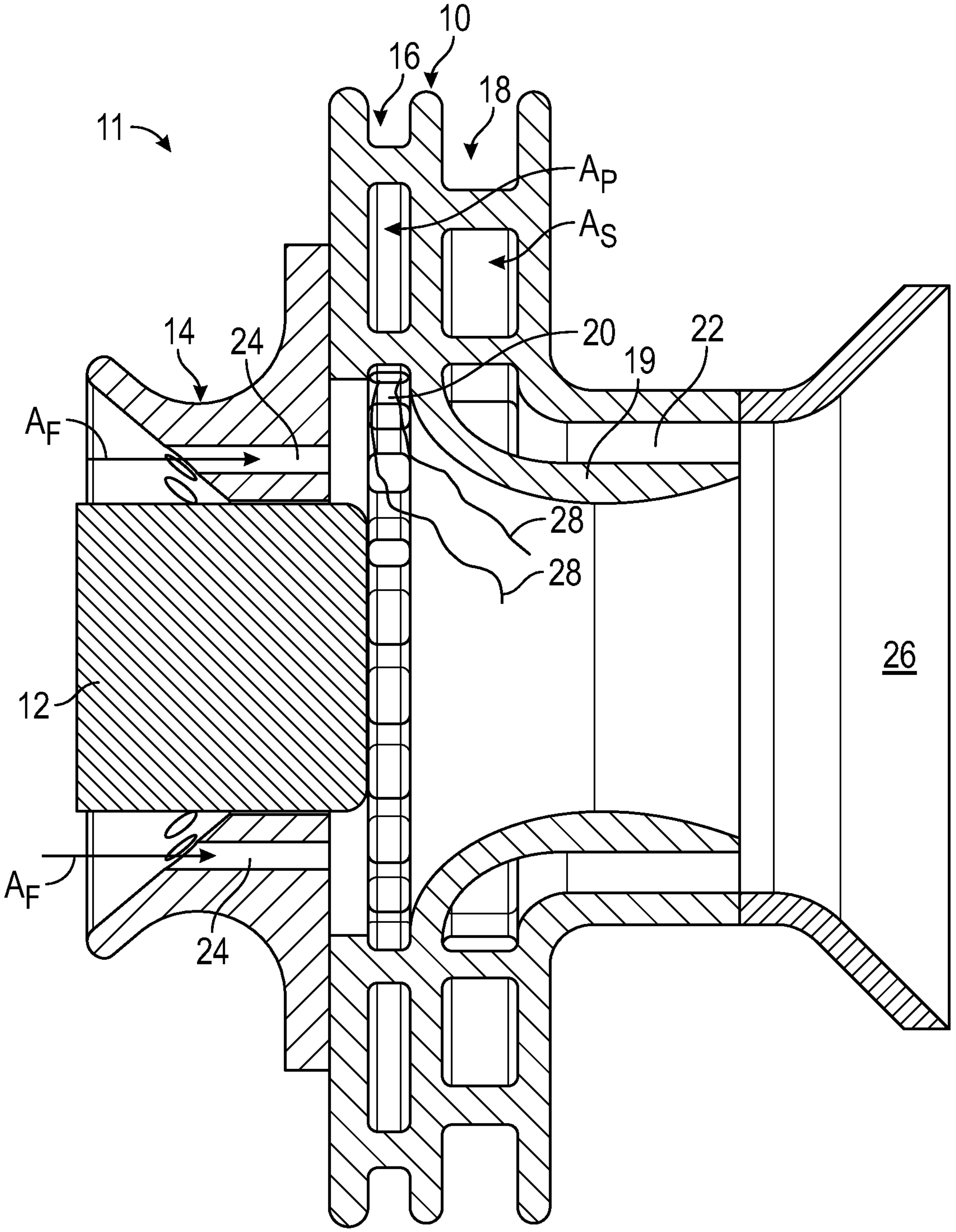
FIG. 1 shows a schematic cross-sectional view of a swirler-ferrule assembly, taken along a centerline of the swirler-ferrule assembly, according to an embodiment of the present disclosure.

FIG. 1 shows a swirler 10. A fuel nozzle 12 may be centered within the swirler 10 with a ferrule 14. The swirler 10, the fuel nozzle 12, and the ferrule 14 may form a swirler-ferrule assembly 11. The fuel nozzle 12 may supply a fuel flow to the swirler 10. The swirler 10 may supply an air flow to mix with the fuel flow to provide a flow of a fuel-air mixture to a passage 26 that is provided to a combustor (not shown) located downstream on the aft side of the swirler 10. The swirler 10 may include a primary swirler vane 16 and a secondary swirler vane 18. The primary swirler vane 16 may include a primary air passage 20 and the secondary swirler vane 18 may include a secondary air passage 22. The ferrule 14 may include a plurality of passages 24. For the purposes of this disclosure, the aft direction may be understood to be downstream of the swirler 10 and the forward direction may be understood to be upstream of the swirler 10.

An air flow $A_P$ may flow through the primary air passage 20 of the primary swirler vane 16. An air flow $A_S$ may flow through the secondary air passage 22 of the secondary swirler vane 18. The swirler 10 may be a radial-radial swirler as the air flow $A_P$ and the air flow $A_S$ may enter the swirler 10 in a radial direction. A curved lip 19 may separate the primary air passage 20 from the secondary air passage 22 as the air $A_P$ and the air flow $A_S$ enter the swirler 10 and flow into the passage 26. The curved lip 19 may be a venturi or flow splitter. An air flow $A_F$ may flow through the plurality of passages 24 of the ferrule 14. The air flow $A_F$ through the ferrule 14 may be an axial purge air flow.

As the air flow $A_F$ through the ferrule 14 and the fuel flow through the fuel nozzle 12 interact with the air flow $A_P$ through the primary swirler vane 16, instabilities 28 may be present in the resulting flow. The instabilities 28 may generate a dead zone for flow, e.g., a zone with very low flow rates as compared to the flow rate through the swirler 10 and the ferrule 14. The instabilities 28 may generate local vortex structures that may be inherently aerodynamically unstable. There may be recirculation bubbles generated behind (e.g., forward of) the air flow $A_P$ because of interaction of the ferrule flow and primary vane flow and geometric features. A recirculation zone or bubble may pull fuel into the recirculation zone, which may result in burning of the fuel within the recirculation zone, reducing the life of the swirler component of the combustor. The recirculation zone may be a region between an exit of the primary swirler vane 16 and an exit of the plurality of passages 24 (e.g., an exit of the purge airflow). Such a recirculation zone causes instabilities due to the interaction of the swirling air flow $A_P$ and the axial air flow $A_F$.

Figure 2:
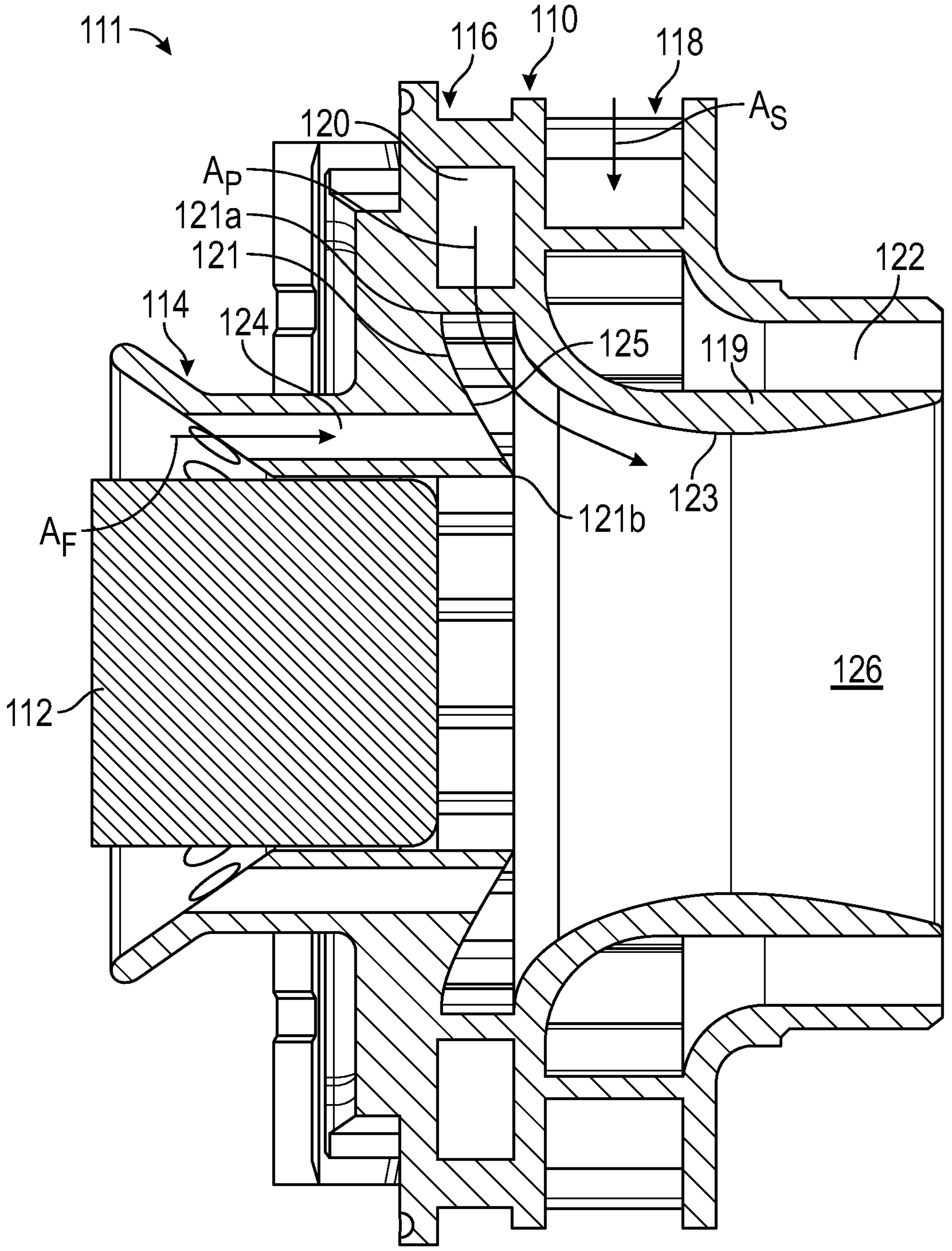
FIG. 2 shows a schematic cross-sectional view of a swirler-ferrule assembly, taken along a centerline of the swirler-ferrule assembly, according to an embodiment of the present disclosure.

FIG. 2 shows a swirler 110 and a ferrule 114. The ferrule may center a fuel nozzle 112 within the swirler 110. The swirler 110, the ferrule 114, and the fuel nozzle 112 may form a swirler-ferrule assembly 111. The swirler 110 may supply an air flow to mix with a fuel flow from the fuel nozzle 112 to provide a flow of a fuel-air mixture to a passage 126 that is provided to a combustor (not shown) located downstream on the aft side of the swirler 110. The swirler 110 may include a primary swirler vane 116 and a secondary swirler vane 118. The primary swirler vane 116 may include a primary air passage 120 and the secondary swirler vane 118 may include a secondary air passage 122. A lip 119 may separate the primary air passage 120 from the secondary air passage 122. The lip 119 may form a venturi surface over which air may flow. The ferrule 114 may be connected to the swirler 110 or integral with the swirler 110. The ferrule 114 may include a plurality of passages 124. The plurality of passages 124 may be axial purge air passages. The plurality of passages 124 may be omitted. As in FIG. 1, air flow $A_P$ and $A_S$ may flow through the swirler 110 and an air flow $A_F$ may flow through the ferrule 114.

With continued reference to FIG. 2, the primary swirler vane 116 may include a first inner surface 121 and a second inner surface 123. The primary air passage 120 may pass between the first inner surface 121 and the second inner surface 123. The first inner surface 121 of the primary swirler vane 116 may be a ramp. The first inner surface 121 may be curved radially inward and axially in an aft direction from a first point 121*a* to a second point 121*b*. Each of the plurality of passages 124 extending through the ferrule 114 may intersect and exit at the first inner surface 121 between the first point 121*a* and the second point 121*b*. The first point 121*a* may be a trailing end of a surface feature 125 and the second point 121*b* may be a distal end of the surface feature 125.

The first inner surface 121 of the primary swirler vane 116 may be the surface feature 125. The second point 121*b* may be an axially aftmost point of the surface feature 125 and a radially innermost point of the surface feature 125. That is, the second point 121*b* may be axially aft of the first point 121*a* and the second point 121*b* may be radially inward of the first point 121*a*. The air flow $A_P$ through the primary swirler vane 116 may be guided by the surface feature 125 into the passage 126. The surface feature 125 directs the air flow $A_P$ over the venturi surface of the lip 119. This may eliminate the recirculation zone present behind the primary swirler vane 116.

Figure 3:
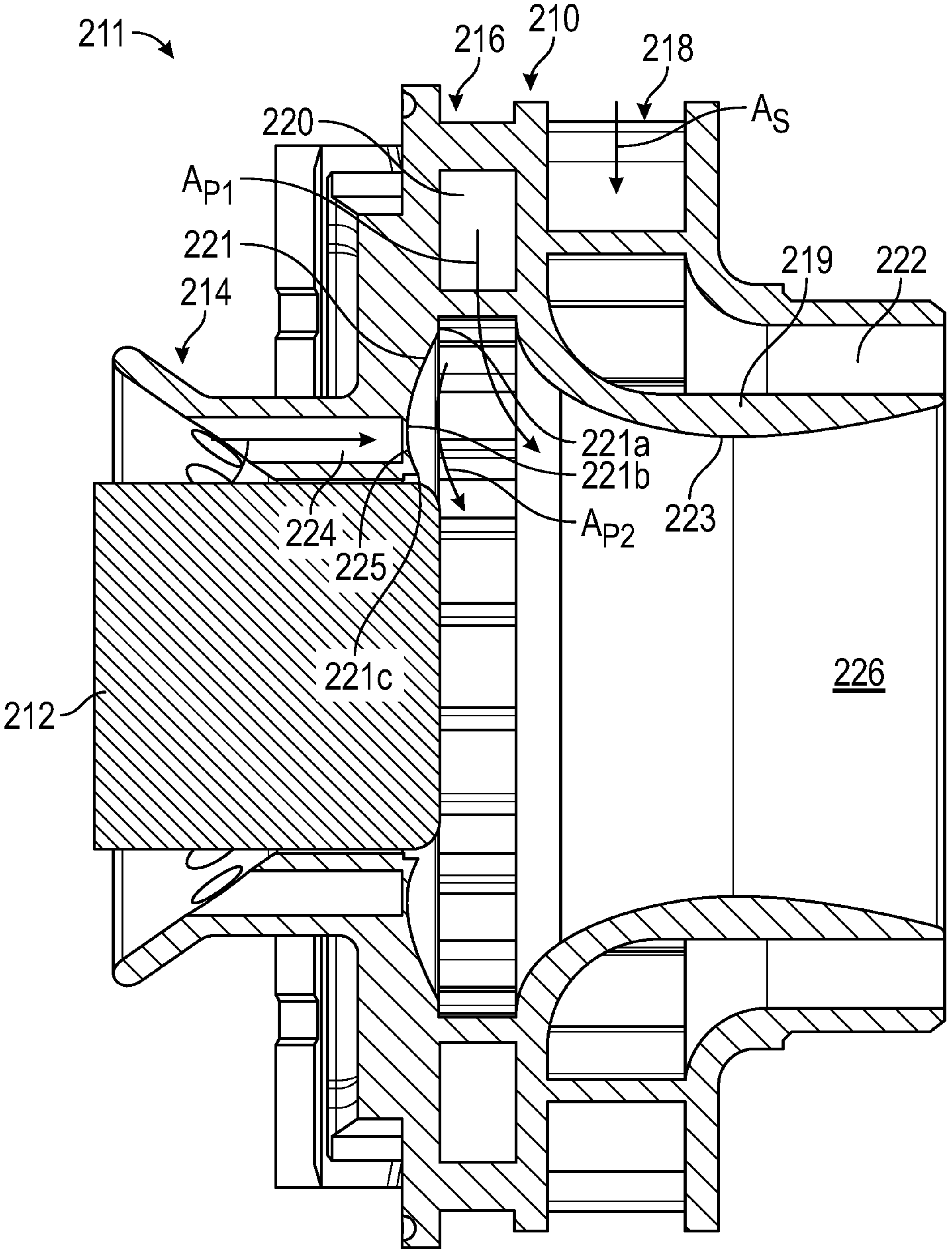
FIG. 3 shows a schematic cross-sectional view of a swirler-ferrule assembly, taken along a centerline of the swirler-ferrule assembly, according to an embodiment of the present disclosure.

FIG. 3 shows a swirler 210 and a ferrule 214. The ferrule 214 may center a fuel nozzle 212 within the swirler 210. The swirler 210, the ferrule 214, and the fuel nozzle 212 may form a swirler-ferrule assembly 211. The swirler 210 may supply an air flow to mix with a fuel flow from the fuel nozzle to provide a flow of a fuel-air mixture to a passage 226 that is provided to a combustor (not shown) located downstream on the aft side of the swirler 210. The swirler 210 may include a primary swirler vane 216 and a secondary swirler vane 218. The primary swirler vane 216 may include a primary air passage 220 and the secondary swirler vane 218 may include a secondary air passage 222. A first lip 219 may separate the primary air passage 220 from the secondary air passage 222. The first lip 219 may be a venturi or flow splitter. The ferrule 214 may be connected to the swirler 210 or integral with the swirler 210. The ferrule 214 may include a plurality of passages 224. As in FIG. 1, air flow $A_S$ may flow through the secondary swirler vane 218 and an air flow $A_F$ may flow through the ferrule 214. Air flows $A_{P1}$ and $A_{P2}$ may flow through the primary swirler vane 216.

With continued reference to FIG. 3, the primary swirler vane 316 may include a first inner surface 221 and a second inner surface 223. The primary air passage 220 may pass between the first inner surface 221 and the second inner surface 223. The first inner surface 221 of the primary swirler vane 216 may be a ramp. The first inner surface 221 may be curved radially inward in a forward direction from a first point 221*a* (e.g., a trailing end) to a second point 221*b* (e.g., an intermediate point) and may be curved axially inward in the forward direction from the first point 221*a* (e.g., a trailing end) to the second point 221*b* (e.g., an intermediate point). From the second point 221*b* to a third point 221*c* (e.g., a distal end), the first inner surface 221 may curve radially inward in an aft direction and axially in the aft direction. Each of the plurality of passages 224 extending through the ferrule 214 may intersect the first inner surface 221 between the first point 221*a* and the third point 221*c* and may exit the first inner surface 221 between the first point 221*a* and the third point 221*c*. Each of the plurality of passages 224 extending through the ferrule 214 may exit at the second point 221*b* or proximate the second point 221*b*.

The first inner surface 221 of the primary swirler vane 216 may be a surface feature 225. The surface feature 225 may gradually expand the primary air passage 220 toward a tip of the fuel nozzle (now shown). The third point 221*c* may be axially forward of the first point 221*a* and axially aft of the second point 221*b*. The third point 221*c* may be the radially innermost point of the surface feature 225. The air flow $A_{P1}$ through the primary swirler vane 216 may be guided by the surface feature 225 (e.g., by the first inner surface 221) into the passage 226. The air flow $A_{P2}$ may enter the passage 226 in a manner similar to, or the same as, the air flow $A_P$ flowing through the primary swirler vane 16 of FIG. 1. The surface feature 225 may gradually expand to the fuel nozzle tip, which may eliminate the recirculation zone behind the primary swirler vane 216. The surface feature 225 may create a flow $A_{P2}$ that sweeps along the first inner surface 221 or flows along the first inner surface 221 to discourage a fuel flow from entering into the recirculation zone behind the primary swirler vane 216 and burning within the recirculation zone behind the primary swirler vane 216.

Figure 4:
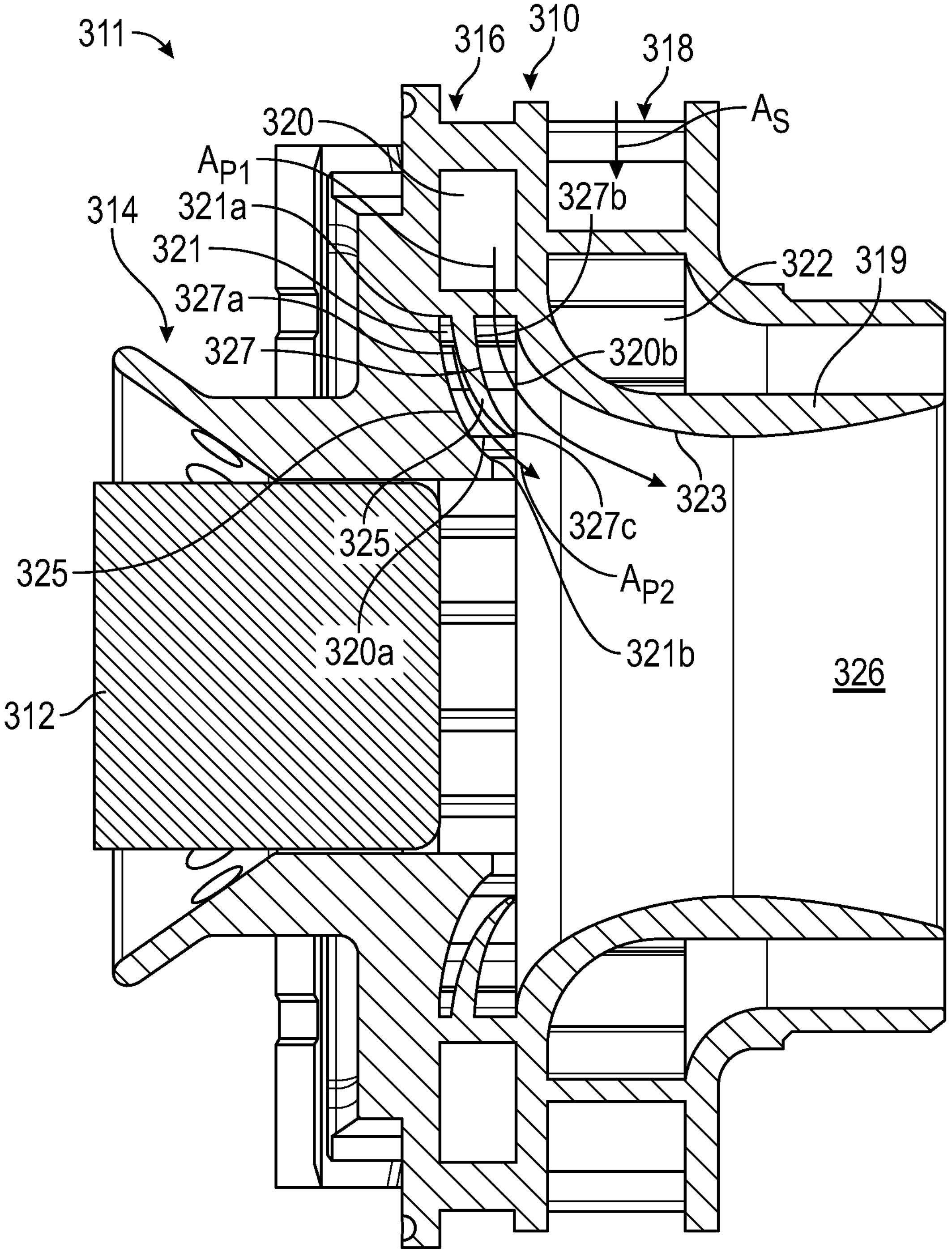
FIG. 4 shows a schematic cross-sectional view of a swirler-ferrule assembly, taken along a centerline of the swirler-ferrule assembly, according to an embodiment of the present disclosure.

FIG. 4 shows a swirler 310 and a ferrule 314. The ferrule 314 may center a fuel nozzle 312 within the swirler 310. The swirler 310, the ferrule 314, and the fuel nozzle 312 may form a swirler-ferrule assembly 311. The swirler 310 may supply an air flow to mix with a fuel flow from the fuel nozzle to provide a flow of a fuel-air mixture to a passage 326 that is provided to a combustor (not shown) located downstream on the aft side of the swirler 310. The swirler 310 may include a primary swirler vane 316 and a secondary swirler vane 318. The primary swirler vane 316 may include a primary air passage 320 and the secondary swirler vane 318 may include a secondary air passage 322. A first lip 319 may separate the primary air passage 320 from the secondary air passage 322. The first lip 319 may be a venturi or a flow splitter. The ferrule 314 may be connected to the swirler 310 or integral with the swirler 310. As shown in FIG. 4, air flow $A_{P1}$ and air flow $A_{P2}$ may flow through the primary swirler vane 316 and air flow $A_S$ may flow through the secondary swirler vane 318. Although not shown, a plurality of passages (e.g., purge air passages) having an air flow therethrough may be present in the ferrule 314 similar to those described above with respect to the discussion of FIGS. 1 to 3. Alternatively, the purge air passages may be omitted.

With continued reference to FIG. 4, the primary swirler vane 316 may include a first inner surface 321 and a second inner surface 323. The primary swirler vane 316 may include a second lip 327 that extends between the first inner surface 321 and the second inner surface 323. The second lip 327 may separate the air flow $A_{P1}$ and the air flow $A_{P2}$. The primary air passage 320 may be separated by the second lip 327 into a first primary air passage 320*a* and a second primary air passage 320*b*. The first primary air passage 320*a* and the second primary air passage 320*b* may pass between the first inner surface 321 and the second inner surface 323. The first inner surface 321 of the primary swirler vane 316 may be curved radially inward in an aft direction from a first point 321*a* to a second point 321*b* and may be curved axially in the aft direction from the first point 321*a* to the second point 321*b*. The second lip 327 may be curved radially inward in an aft direction and axially in the aft direction. The second lip 327 may curve at the same radius as does the first inner surface 321.

The first inner surface 321 of the primary swirler vane 316 and the second lip 327 may together form a surface feature 325. Both the first inner surface 321 and the second lip 327 may guide the air flow through the primary swirler vane 316. That is, the first inner surface 321 may guide the air flow $A_{P1}$ from a swirler inlet to the passage 326. The second lip 327 may guide the air flow $A_{P1}$ on a forward surface 327*a* and may guide the air flow $A_{P2}$ on an aft surface 327*b* toward the passage 326.

The second point 321*b* may be an axially aftmost of the first inner surface 321 and radially innermost point of the first inner surface 321. The terminal end 327*c* of the second lip 327 may be an axially aftmost point of the second lip 327 and radially innermost point of the second lip 327. The second point 321*b* may be the radially innermost point of the surface feature 325. The terminal end 327*c* may form the axially aftmost point of the surface feature 325. That is, the second point 321*b* may be radially inward of the first point 321*a* and the second lip 327. The terminal end 327*c* may be axially aft of the second point 321*b*. The surface feature 325 may guide the air flow $A_{P2}$ along the second inner surface 323, which may be a venturi surface of the first lip 319. The surface feature 325 may cause the air flow $A_{P1}$ to control a fuel flow from entering into the recirculation zone and/or from returning upstream toward the primary swirler vane 316. The second lip 327 may operate as a splitter on the primary swirler vane 316. The second lip 327 may assist in isolating a high swirling primary air flow (e.g., $A_{P2}$) from a lower swirling air flow (e.g., $A_{P1}$) that is intended to purge the fuel flow at the fuel nozzle tip.

Any of the swirlers of FIGS. 2 to 4 may be combined with a three-dimensional flowpath surface. The three-dimensional flowpath surface may exist within the swirler and/or at the exit of the swirler. The three-dimensional flowpath surface may provide an aerodynamic flowpath that may eliminate the unstable recirculation zone. The swirlers of FIGS. 2 to 4 provide contoured surfaces to eliminate recirculation zones, eliminate purge air passages and holes, direct primary swirler vane air flow to sweep the surface of the exit of the purge air passages, eliminate recirculation zones that exist without purge air passages, or any combination thereof.

Figure 5:
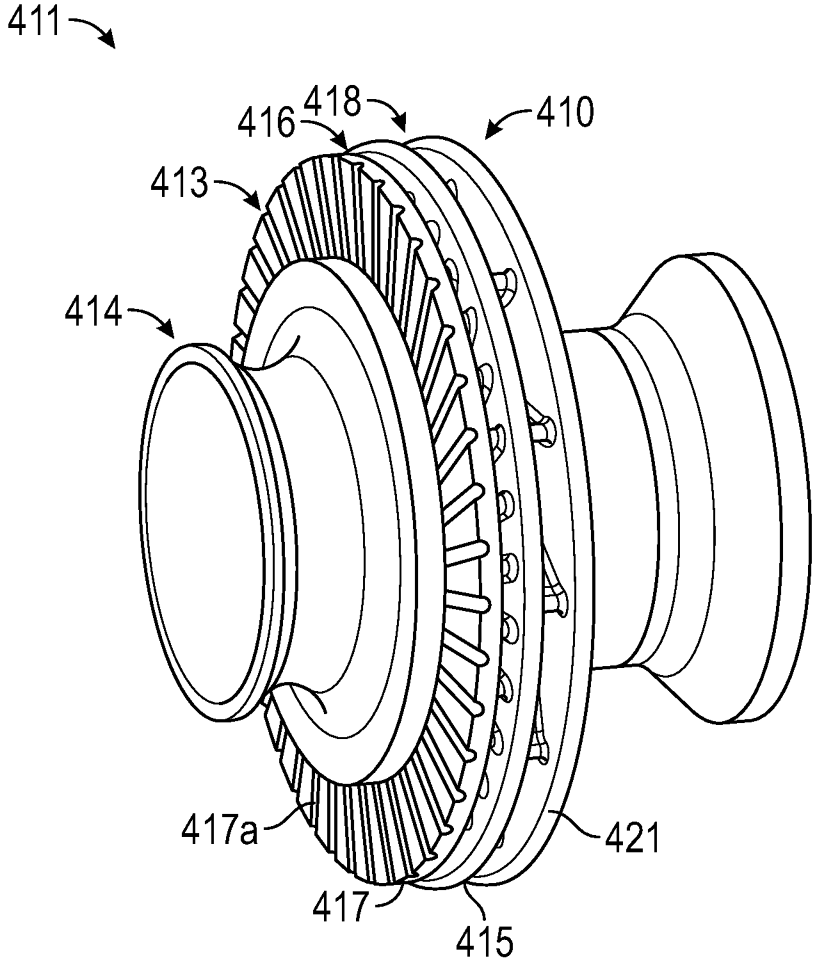
FIG. 5 shows a schematic perspective view of a swirler-ferrule assembly, according to an embodiment of the present disclosure.
Figure 6:
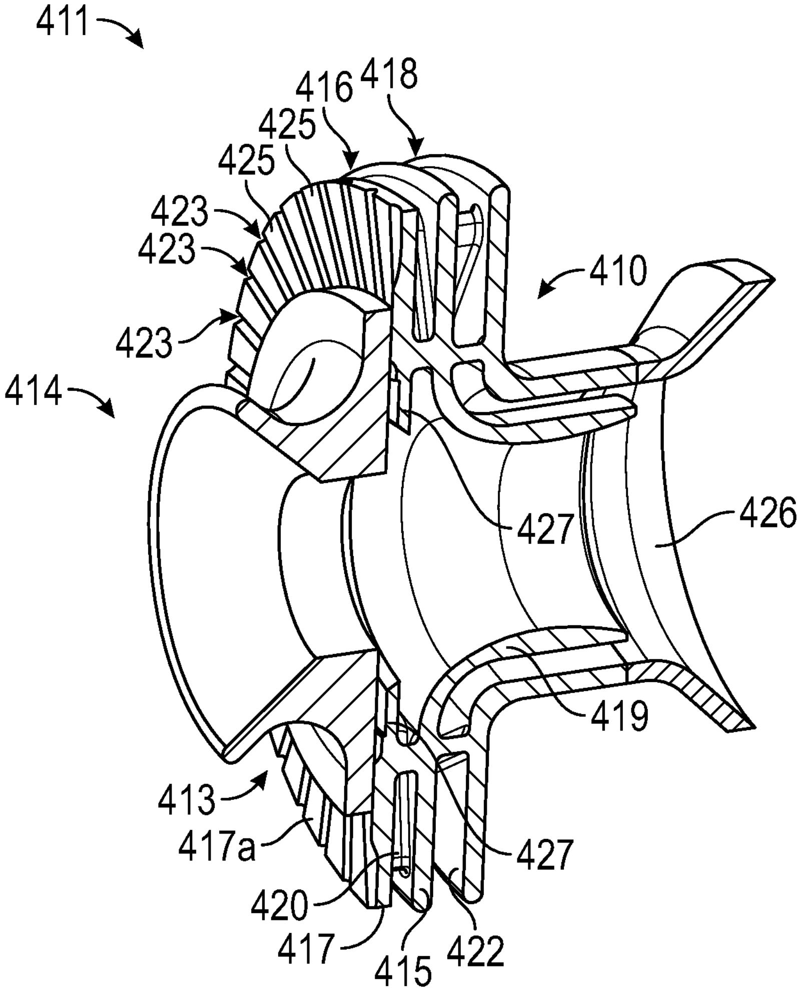
FIG. 6 shows a schematic cross-sectional perspective view of the swirler-ferrule assembly of FIG. 5, taken along a centerline of the swirler-ferrule assembly, according to an embodiment of the present disclosure.
Figure 7:
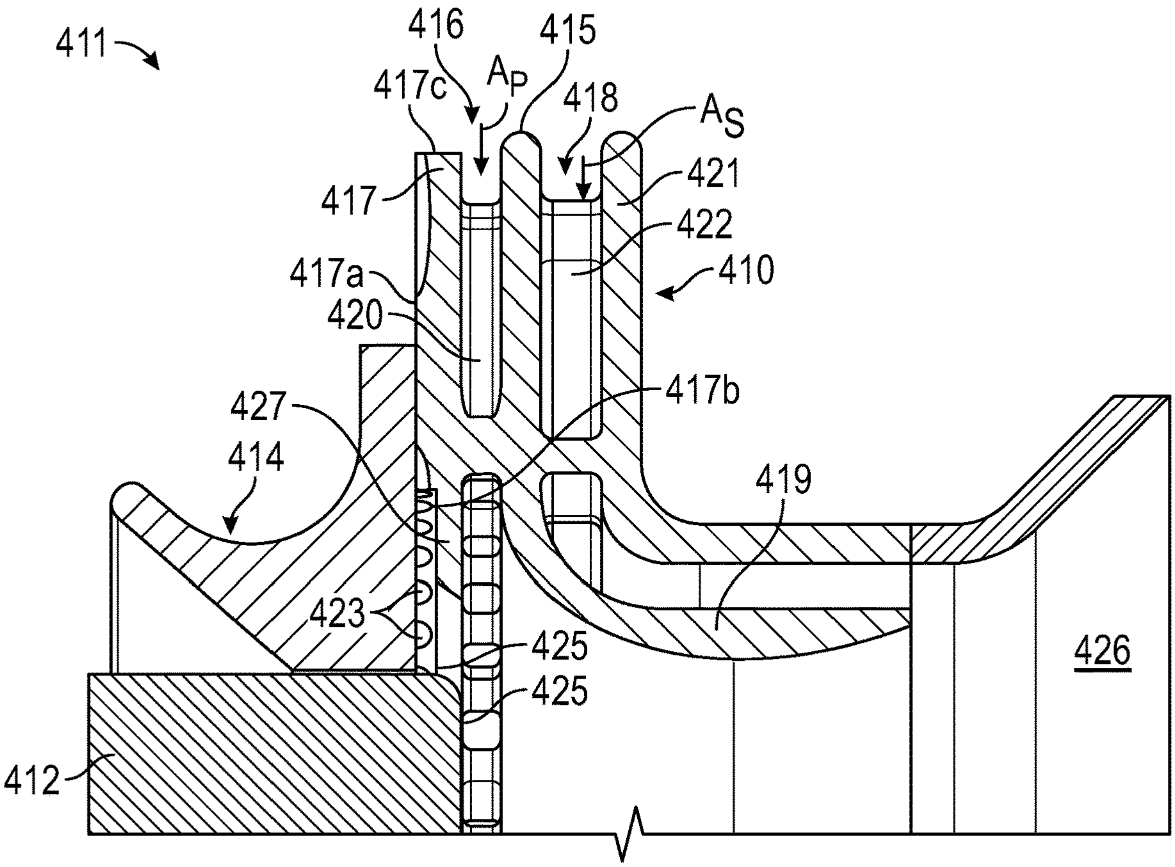
FIG. 7 shows a schematic cross-sectional view of the swirler-ferrule assembly of FIG. 5, according to an embodiment of the present disclosure.

FIGS. 5 to 7 show a swirler 410 and a ferrule 414. The ferrule 414 may center a fuel nozzle 412 within the swirler 410. The swirler 410, the ferrule 414, and the fuel nozzle 412 may form a swirler-ferrule assembly 411. The swirler 410 may supply an air flow to mix with a fuel flow from the fuel nozzle to provide a flow of a fuel-air mixture to a passage 426 that is provided to a combustor (not shown) located downstream on the aft side of the swirler 410. The swirler 410 may include a primary swirler vane 416 and a secondary swirler vane 418. The primary swirler vane 416 may include a primary air passage 420 and the secondary swirler vane 418 may include a secondary air passage 422. A first wall 415 and a first lip 419 may separate the primary air passage 420 from the secondary air passage 422. The first lip 419 may be a venturi or a flow splitter. A second lip 427 may extend radially inward from a second wall 417 of the primary swirler vane 416.

The ferrule 414 may be connected to the swirler 410 or integral with the swirler 410. As shown in FIG. 1, air flow $A_P$ may flow through the primary swirler vane 416 and air flow $A_S$ may flow through the secondary swirler vane 418. Although not shown, a plurality of passages (e.g., purge air passages) having an air flow therethrough may be present in the ferrule 414 similar to those described with respect to FIGS. 1 to 3. Alternatively, the purge air passages may be omitted.

The primary swirler vane 416 may include the first wall 415 and the second wall 417 with the primary air passage 420 extending therebetween. The second wall 417 may include a forward surface 417*a*. The forward surface 417*a* may include a surface feature 413 thereon. Although shown on the forward surface 417*a*, the surface feature 413 may be present on the aft surface of the second wall 417, the forward surface of the first wall 415, the aft surface of the first wall 415, the forward surface of a third wall 421, an aft surface of the ferrule 414, or any combination thereof. The surface feature 413 may include a plurality of grooves 423 between flat portions 425 of the forward surface 417*a*.

The plurality of grooves 423 may be tangential grooves on the forward face (e.g., forward surface 417*a*) of the swirler 410. The plurality of grooves 423 may create a tangential flow across the forward surface 417*a*. This may avoid low velocity regions in the cavity formed between the ferrule plate and the forward surface 417*a* of the swirler 410. The flow generated through the plurality of grooves 423 may suppress the unstable flow in the recirculation zone. The plurality of grooves 423 may be any of the plurality of grooves 423 described with respect to FIGS. 8 to 10.

The second lip 427 may be a wedge lip. The second lip 427 may de-couple the flow interaction between the ferrule 414 and the primary swirler vane 416 at an exit of the primary swirler vane 416. This may avoid auto-ignition of the fuel-air mixture. For example, the second lip 427 may deflect the air flow from the ferrule to delay the interaction with the primary air flow $A_P$. The second lip 427 may have a length that is a percentage of the distance between the inner diameter of the ferrule 414 and an inner diameter of the primary swirler vane 416.

The aft surface of the ferrule 414 (e.g., the surface of the ferrule plate) and/or the forward surface 417*a* (e.g., the surface on which surface feature 413 is present) may include an anti-wear coating.

Figure 8:
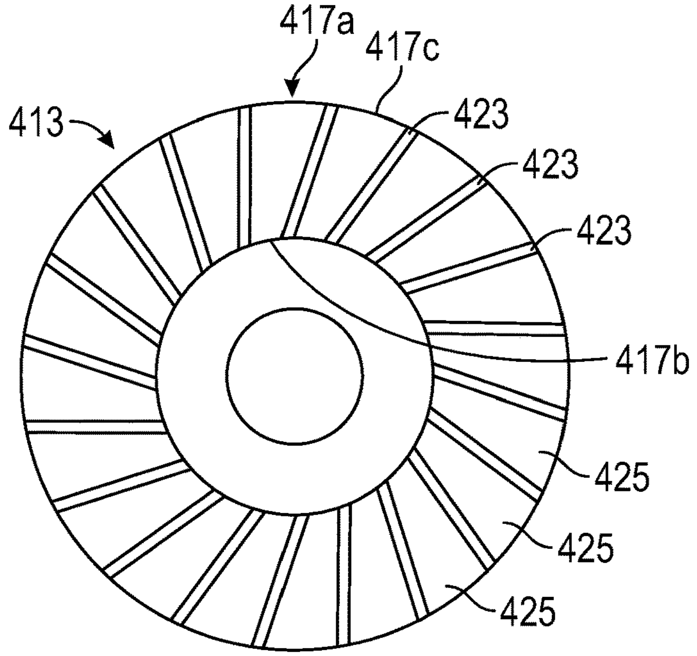
FIG. 8 shows a schematic view of a surface of a swirler vane, according to an embodiment of the present disclosure.
Figure 9:
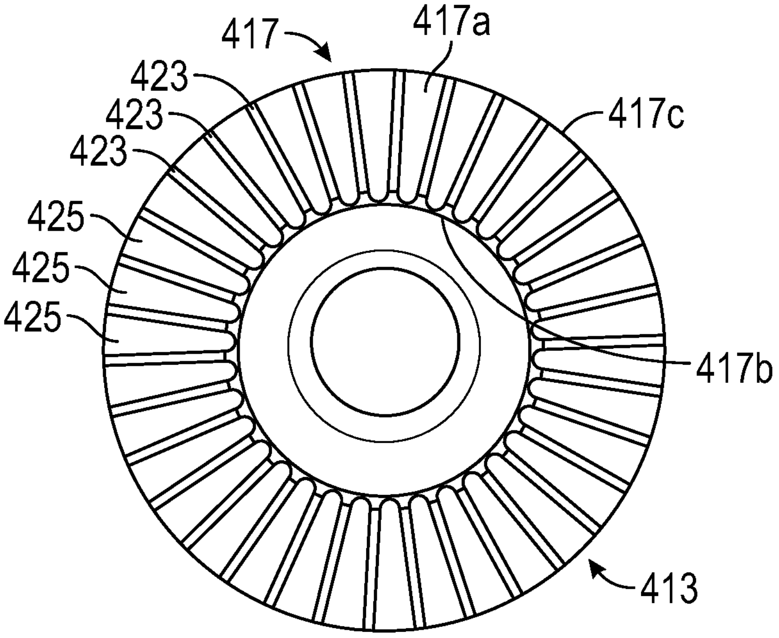
FIG. 9 shows a schematic view of a surface of a swirler vane, according to an embodiment of the present disclosure.
Figure 10:
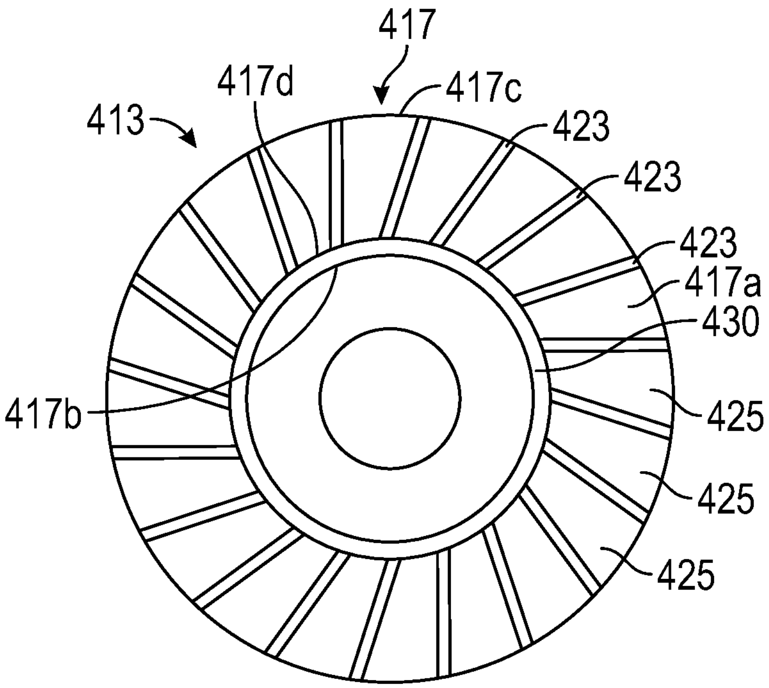
FIG. 10 shows a schematic view of a surface of a swirler vane, according to an embodiment of the present disclosure.

FIGS. 8 to 10 show various orientations of the plurality of grooves 423 and the flat portions 425 on the forward surface 417*a* of the surface feature 413. As shown in FIG. 8, the plurality of grooves 423 may be tangential grooves. That is, the plurality of grooves 423 may extend in tangential direction from a radially inner surface 417*b* to a radially outer surface 417*c* of the second wall 417. Other angles for the plurality of grooves 423 are contemplated. As shown in FIG. 9, the plurality of grooves 423 may be radially extending grooves. That is, the plurality of grooves 423 may extend in a radial direction from the radially inner surface 417*b* to the radially outer surface 417*c* of the second wall 417. As shown in FIG. 10, the plurality of grooves 423 may be tangential grooves and may include an annular gap 430 between the radially inner surface 417*b* of the second wall 417 and a radially inner surface 417*d* at which the plurality of grooves 423 begin. As shown in FIG. 8, the plurality of grooves 423 may extend to the radially outer surface 417*c*.

The plurality of grooves 423 in FIGS. 8 to 10 may be semi-circular in shape, although other shapes are contemplated. The number of the plurality of grooves 423 may be selected to maintain a desired or a predetermined flow rate. As the number of the plurality of grooves 423 increases, the width of each of the plurality of grooves 423 may decrease to maintain a flow rate and vice versa. Thus, the number of the plurality of grooves 423 and the width of each of the plurality of grooves 423 is directly related to a flow rate across the surface feature 413.

Figure 11:
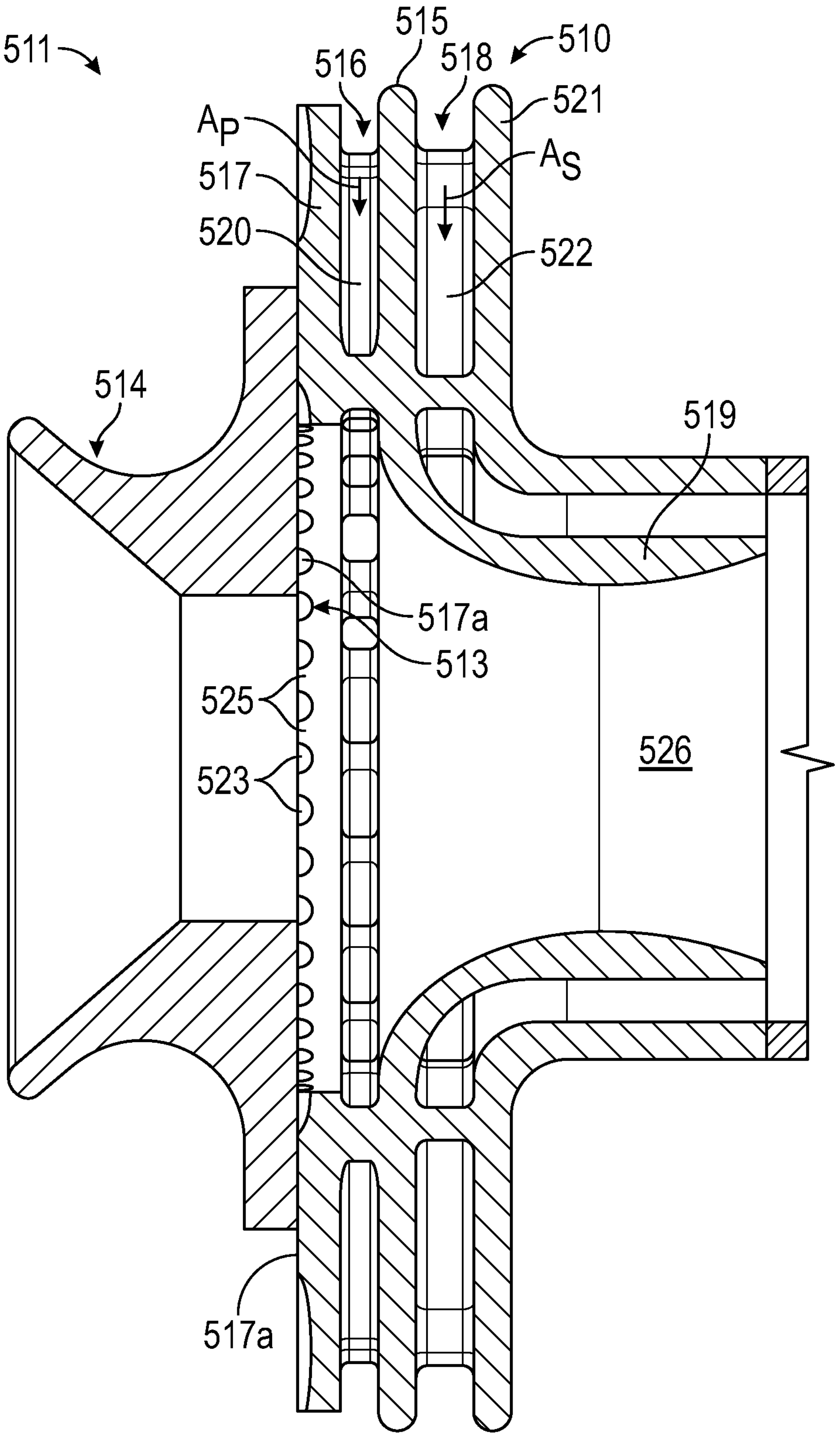
FIG. 11 shows a schematic cross-sectional view of a swirler-ferrule assembly, taken along a centerline of the swirler-ferrule assembly, according to an embodiment of the present disclosure.

FIG. 11 shows a swirler 510 and a ferrule 514. The fuel nozzle is omitted for clarity. The fuel nozzle, however, may be the same as or similar to the fuel nozzle 12 shown in FIG. 1. The swirler 510, the fuel nozzle, and the ferrule 514 may form a swirler-ferrule assembly 511. The swirler 510 may supply an air flow to mix with a fuel flow from the fuel nozzle to provide a flow of a fuel-air mixture to a passage 526 that is provided to a combustor (not shown) located downstream on the aft side of the swirler 510. The swirler 510 may include a primary swirler vane 516 and a secondary swirler vane 518. The primary swirler vane 516 may include a primary air passage 520 and the secondary swirler vane 518 may include a secondary air passage 522. A first wall 515 and a first lip 519 may separate the primary air passage 520 from the secondary air passage 522. The first lip 519 may be a venturi or a flow splitter.

The ferrule 514 may be connected to the swirler 510 or integral with the swirler 510. As shown in FIG. 1, air flow $A_P$ may flow through the primary swirler vane 516 and air flow $A_S$ may flow through the secondary swirler vane 518. Although not shown, a plurality of passages (e.g., purge air passages) having an air flow therethrough may be present in the ferrule 514 similar to those described above with respect to FIGS. 1 to 3. Alternatively, the purge air passages may be omitted.

The primary swirler vane 516 may include the first wall 515 and a second wall 517 with the primary air passage 520 extending therebetween. The second wall 517 may include a forward surface 517*a*. The forward surface 517*a* may include a surface feature 513 thereon. Although shown on the forward surface 517*a*, the surface feature 513 may be present on the aft surface of the second wall 517, the forward surface of the first wall 515, the aft surface of the first wall 515, the forward surface of a third wall 521, an aft surface of the ferrule 514, or any combination thereof. The surface feature 513 may include a plurality of grooves 523 between flat portions 525 of the forward surface 517*a*. The surface feature 513 may be arranged in any of the manners described with respect to FIGS. 8 to 10. The aft surface of the ferrule 514 (e.g., the surface of the ferrule plate) and/or the forward surface 517*a* (e.g., the surface on which surface feature 513 is present) may include an anti-wear coating. The lip extending from the primary swirler vane 516 (e.g., second lip 427) may be omitted.

Figure 12:
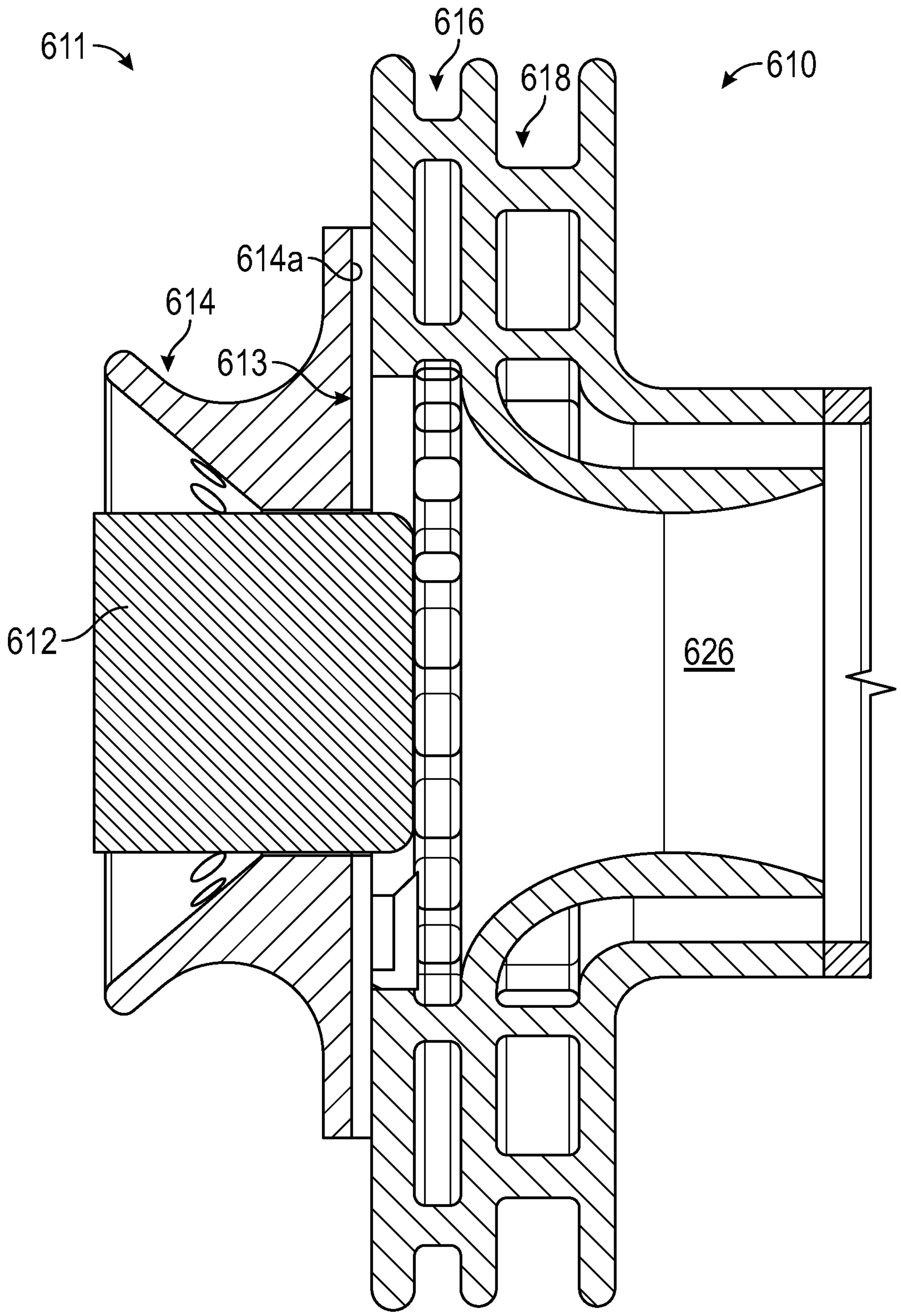
FIG. 12 shows a schematic cross-sectional view of a swirler-ferrule assembly, taken along a centerline of the swirler-ferrule assembly, according to an embodiment of the present disclosure.

FIG. 12 shows a swirler 610 and a ferrule 614. A fuel nozzle 612 may be centered within the swirler 610 with the ferrule 614. The swirler 610, the fuel nozzle, and the ferrule 614 may form a swirler-ferrule assembly 611. The swirler 610 may supply an air flow to mix with a fuel flow from the fuel nozzle 612 to provide a flow of a fuel-air mixture to a passage 626 that is provided to a combustor (not shown) located downstream on the aft side of the swirler 610. The swirler 610 may include a primary swirler vane 616 and a secondary swirler vane 618. The primary swirler vane 616 and the secondary swirler vane 618 may include a first lip, air passages, and air flows as previously described herein. An aft surface 614*a* of the ferrule 614 may be provided with a surface feature 613. The surface feature 613 may be any of the surface features described with respect to FIGS. 8 to 10. The aft surface 614*a* of the ferrule 614 (e.g., the aft surface of the ferrule plate and the surface on which the surface feature 613 is present) and/or the forward surface of the primary swirler vane 616. Although not shown, the ferrule 614 may include a plurality of passages for providing a purge air flow to the passage 626, such as those described with respect to FIGS. 1 to 3.

Figure 13:
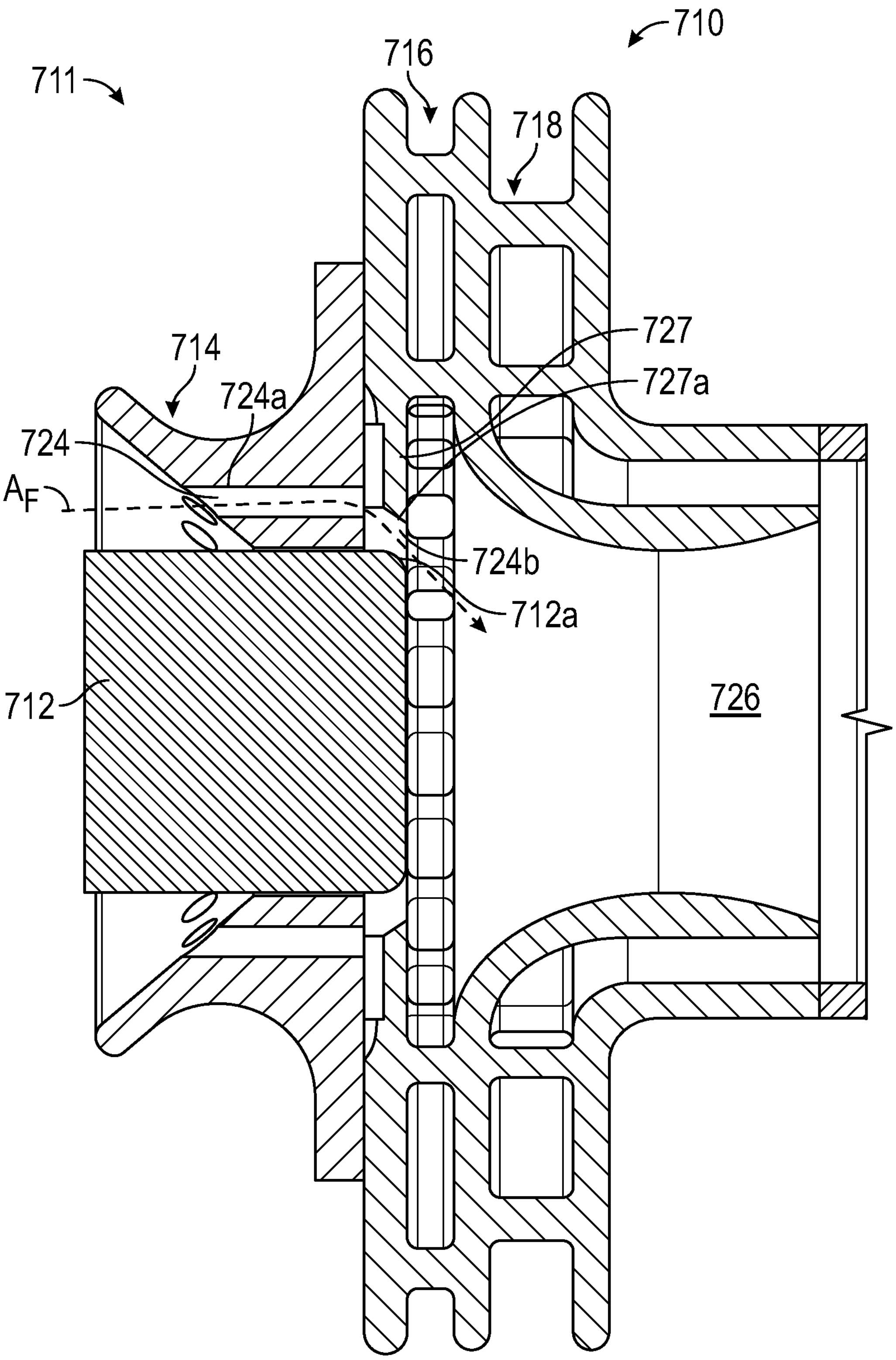
FIG. 13 shows a schematic cross-sectional view of a swirler-ferrule assembly, taken along a centerline of the swirler-ferrule assembly, according to an embodiment of the present disclosure.

FIG. 13 shows a swirler 710 and a ferrule 714. A fuel nozzle 712 may be centered within the swirler 710 with the ferrule 714. The swirler 710, the fuel nozzle 712, and the ferrule 714 may form a swirler-ferrule assembly 711. The swirler 710 may supply an air flow to mix with a fuel flow from the fuel nozzle 712 to provide a flow of a fuel-air mixture to a passage 726 that is provided to a combustor (not shown) located downstream on the aft side of the swirler 710. The swirler 710 may include a primary swirler vane 716 and a secondary swirler vane 718. The primary swirler vane 716 and the secondary swirler vane 718 may include a first lip, air passages, and air flows as previously described herein.

The ferrule 714 may include a plurality of passages 724 for providing a purge air flow $A_F$ to the passage 726. Each of the plurality of passages 724 may include an axial portion 724*a* and an angled portion 724*b*. The axial portion 724*a* may extend through the ferrule 714 in a generally axial direction from a forward side of the ferrule 714 to an aft side of the ferrule 714. The angled portion 724*b* may extend radially inward from an exit of the axial portion 724*a*. The angled portion 724*b* may be defined between an angled surface 727*a* of a lip 727 and an outer surface 712*a* of the fuel nozzle 712. The angled portion 724*b* may be oriented in a tangential manner. Thus, the air flow $A_F$ through the ferrule 714 may have an axial direction at the inlet and a tangential or a radial (or other angled) direction at the outlet (e.g., through angled portion 724*b*). This may reduce the direct flow impact from the axial ferrule flow on the primary swirler vane flow. That is, the lip 727 may deflect the air flow from the plurality of passages 724 of the ferrule 714 to delay the interaction with the primary air flow through the primary swirler vane 716.

Although not shown, a surface feature may be present on a forward surface of a wall of the primary swirler vane, an aft surface of a wall of the primary swirler vane, a forward surface of a wall of the secondary swirler vane, an aft surface of a wall of the secondary swirler vane, an aft surface of the ferrule, or any combination thereof. The surface feature may be arranged in any of the manners described in FIGS. 8 to 10. Alternatively, the surface feature may be omitted.

The swirler-ferrule assemblies of FIGS. 5 to 13 may include tangential grooves and a lip on a forward face of the swirler to de-couple flow interaction between the ferrule and the primary swirler vane flow at the primary swirler vane flow exit. The swirler-ferrule assemblies of FIGS. 5 to 13 may include tangential grooves on a forward face of the swirler and may further include a wedge lip feature on an inner diameter of the swirler forward face. This may avoid or prevent low velocity regions created in a cavity formed between the ferrule plate and the swirler forward face (e.g., forward surface 417*a*). This may lower auto-ignition risk.

The swirler-ferrule assemblies of FIGS. 5 to 13 may include a wedge lip feature on the inner diameter of the swirler forward face that may avoid the low velocity region between the ferrule plate aft face and the swirler forward face inner diameter, thereby avoiding entrainment of fuel-air mixture in low velocity regions to avoid auto-ignition and flame holding.

The swirler-ferrule assemblies of FIGS. 5 to 13 may be provided with one or more grooves. The grooves may be located on an aft face of the ferrule plate, may be located on the swirler independently without the inclusion of the wedge lip, may be radial, may be directly cut across a forward face of the swirler, a cavity may be formed at the exit of the ferrule plate and the forward face of the swirler such that the flow exits through annulus gap, or any combination thereof. The one or more grooves may be any shape. The one or more grooves may have a radial flow direction at the inlet and may change to a tangential direction as the flow exits into the venturi region. The one or more grooves may be located on an inner diameter of the ferrule plate such that the axial flow from the ferrule (e.g., the purge air flow) may be directed away from the primary swirler vane air flow.

The swirler-ferrule assemblies of FIGS. 5 to 13 may include a combination of a wedge lip on the swirler forward face and axial ferrule flow. This may deflect flow from the axial ferrule to a center of the venturi. The swirler-ferrule assemblies of FIGS. 5 to 13 may include protrusions on the face of either the aft surface of the ferrule plate and/or the forward face of the swirler. This may allow positive flow between the forward face of the swirler and the aft face of the ferrule plate.

The swirlers of the present disclosure may be radial-radial (e.g., rad-rad) swirlers. That is, the air flow may enter the primary swirler vane and the secondary swirler vane and exit the primary swirler vane and the secondary swirler vane in a radial direction. An axial air flow purge system (e.g., through axial passages in a ferrule) may be provided in conjunction with the radial-radial swirler.

In the swirler-ferrule assemblies of the present disclosure, the fuel nozzle may be downstream of a trailing end of the surface feature. That is, a distal, aftmost surface of the fuel nozzle may be located at the same axial location or at a downstream axial location (e.g., aft of) the trailing end of the surface feature.

Any of the surface features of the present disclosure and/or the surfaces upon which the surface features are present may include an anti-wear coating. An anti-wear coating may be provided on the ferrule plate (e.g., an aft or forward face of the ferrule plate) and/or the swirler forward face. The anti-wear coating may improve the life of the ferrule and/or enhance the life of the ferrule, the swirler, and/or the ferrule-swirler assembly.

The swirler-ferrule assemblies of the present disclosure may reduce the interaction of the ferrule air flow with the primary swirler vane air flow by providing surface features within the swirler and/or the ferrule, as compared to swirlers without the described surface features. This may reduce flow instabilities inside the venturi region of the swirler. Additionally, the surface features may limit or prevent a fuel-air mixture flow into a low velocity region formed between the primary swirler forward face inner diameter and the ferrule plate, thus, reducing the risk of auto-ignition and flame holding.

Further aspects of the present disclosure are provided by the subject matter of the following clauses.

A swirler-ferrule assembly including a radial swirler including (a) a primary swirler vane having a primary air passage, and (b) a secondary swirler vane having a secondary air passage, a fuel nozzle configured to deliver fuel to a combustor, a ferrule connected to the radial swirler, the ferrule configured to center the fuel nozzle in the radial swirler, and a surface feature having a trailing end and a distal end, the surface feature being located on the primary swirler vane and configured to direct an air flow through the primary air passage away from a recirculation zone located upstream of the primary swirler vane, wherein the fuel nozzle is axially aligned with the trailing end of the surface feature or is located axially downstream of the trailing end of the surface feature.

The swirler-ferrule assembly of any preceding clause, further comprising an anti-wear coating on the surface feature.

The swirler-ferrule assembly of any preceding clause, the surface feature is a ramp that is curved radially inward in an aft direction and axially in the aft direction from the trailing end of the surface feature to the distal end.

The swirler-ferrule assembly of any preceding clause, the ferrule including a plurality of purge-air passages, each of the plurality of purge-air passages configured to intersect the surface feature between the trailing end and the distal end.

The swirler-ferrule assembly of any preceding clause, further including a lip having a venturi surface, the lip extending between the primary air passage and the secondary air passage, wherein the surface feature is configured to guide the air flow through the primary air passage toward the venturi surface.

The swirler-ferrule assembly of any preceding clause, wherein the surface feature is a ramp that is curved radially inward in a forward direction and axially in the forward direction from the trailing end to an intermediate point of the surface feature and is curved radially inward in an aft direction and axially in the aft direction from the intermediate point to the distal end.

The swirler-ferrule assembly of any preceding clause, the ferrule comprising a plurality of purge-air passages, each of the plurality of purge-air passages configured to intersect the surface feature between the trailing end and the distal end.

The swirler-ferrule assembly of any preceding clause, wherein the surface feature is a first lip, the first lip extending within the primary swirler vane and being curved radially inward in an aft direction and axially in the aft direction from the trailing end of the surface feature to the distal end of the surface feature, and wherein the primary swirler vane includes a ramp surface.

The swirler-ferrule assembly of any preceding clause, further including a second lip having a venturi surface, the second lip extending between the primary swirler vane and the secondary swirler vane, wherein the first lip divides the air flow through the primary swirler vane into a first air flow guided along the ramp surface of the primary swirler vane and a second air flow guided along the venturi surface.

A swirler-ferrule assembly including a radial swirler including (a) a primary swirler vane having a primary air passage, and (b) a secondary swirler vane having a secondary air passage, a fuel nozzle configured to deliver fuel to a combustor, a ferrule connected to the radial swirler, the ferrule configured to center the fuel nozzle in the radial swirler, and a surface feature comprising a plurality of grooves, the surface feature being located on the radial swirler or the ferrule and configured to direct a primary air flow through the primary air passage away from a recirculation zone located upstream of the primary swirler vane.

The swirler-ferrule assembly of any preceding clause, further including a lip having a venturi surface, the lip extending between the primary swirler vane and the secondary swirler vane.

The swirler-ferrule assembly of any preceding clause, wherein the plurality of grooves are oriented in a radial direction.

The swirler-ferrule assembly of any preceding clause, the ferrule having an aft surface, the surface feature being located on the aft surface.

The swirler-ferrule assembly of any preceding clause, wherein the plurality of grooves are oriented in a tangential direction.

The swirler-ferrule assembly of any preceding clause, the primary swirler vane having a first wall and a second wall, the primary air passage extending between the first wall and the second wall, wherein the surface feature is located on a forward surface of the second wall, the surface feature further comprising an annular gap between a first radially inner surface of the second wall and a second radially inner surface at which the plurality of grooves begin.

The swirler-ferrule assembly of any preceding clause, the primary swirler vane having a first wall and a second wall, the primary air passage extending between the first wall and the second wall, wherein the surface feature is located on a forward surface of the second wall.

The swirler-ferrule assembly of any preceding clause, further including a lip extending from the second wall, wherein the lip is configured to deflect an air flow from the ferrule away from the primary air flow.

The swirler-ferrule assembly of any preceding clause, the lip extending radially inward from a second wall inner diameter and ending radially outward of a ferrule inner diameter.

The swirler-ferrule assembly of any preceding clause, further including a plurality of purge air passages, wherein each purge air passage of the plurality of purge air passages includes an axial portion defined in the ferrule and a tangential portion defined between the lip and an outer surface of the fuel nozzle.

The swirler-ferrule assembly of any preceding clause, further including a lip extending from the primary swirler vane, wherein the lip is configured to deflect an air flow from the ferrule away from the primary air flow.

The swirler-ferrule assembly of any preceding clause, further including a plurality of purge air passages, wherein each purge air passage of the plurality of purge air passages includes an axial portion defined in the ferrule and a tangential portion or a radial portion defined between the lip and an outer surface of the fuel nozzle.

Although the foregoing description is directed to the preferred embodiments, it is noted that other variations and modifications will be apparent to those skilled in the art, and may be made without departing from the spirit or scope of the disclosure. Moreover, features described in connection with one embodiment may be used in conjunction with other embodiments, even if not explicitly stated above.

The invention claimed is:

1. A swirler-ferrule assembly comprising:

a radial swirler including:

(a) a primary swirler vane having a forward wall, an aft wall, and a primary air passage defined between the forward wall and the aft wall, wherein the forward wall defines a surface feature; and (b) a secondary swirler vane having a secondary air passage;

a fuel nozzle configured to deliver fuel to a combustor;

a ferrule connected to the radial swirler, the ferrule configured to center the fuel nozzle in the radial swirler; and the surface feature having a trailing end and a distal end and configured to direct an air flow through the primary air passage away from a recirculation zone located upstream of the primary swirler vane, wherein the fuel nozzle is axially aligned with the trailing end of the surface feature.

2. The swirler-ferrule assembly of claim 1, wherein the surface feature is a ramp that is curved radially inward in an aft direction and axially in the aft direction from the trailing end of the surface feature to the distal end.

3. The swirler-ferrule assembly of claim 2, the ferrule comprising a plurality of purge-air passages, each of the plurality of purge-air passages configured to intersect the surface feature between the trailing end and the distal end.

4. The swirler-ferrule assembly of claim 2, the aft wall further comprising a lip having a venturi surface, the lip extending between the primary air passage and the secondary air passage, wherein the surface feature is configured to guide the air flow through the primary air passage toward the venturi surface.

5. The swirler-ferrule assembly of claim 1, wherein the surface feature is a ramp that is curved radially inward in a forward direction and axially in the forward direction from the trailing end to an intermediate point of the surface feature and is curved radially inward in an aft direction and axially in the aft direction from the intermediate point to the distal end.

6. The swirler-ferrule assembly of claim 5, the ferrule comprising a plurality of purge-air passages, each of the plurality of purge-air passages configured to intersect the surface feature between the trailing end and the distal end.

7. The swirler-ferrule assembly of claim 1, wherein the surface feature is a first lip, the first lip extending within the primary swirler vane and being curved radially inward in an aft direction and axially in the aft direction from the trailing end of the surface feature to the distal end of the surface feature, and wherein the primary swirler vane includes a ramp surface.

8. The swirler-ferrule assembly of claim 7, further comprising a second lip having a venturi surface, the second lip extending between the primary swirler vane and the secondary swirler vane, wherein the first lip divides the air flow through the primary swirler vane into a first air flow guided along the ramp surface of the primary swirler vane and a second air flow guided along the venturi surface.

9. A swirler-ferrule assembly comprising:

a radial swirler including:

(a) a primary swirler vane having a first wall, a second wall, and a primary air passage extending between the first wall and the second wall; and (b) a secondary swirler vane having a secondary air passage;

a fuel nozzle configured to deliver fuel to a combustor;

a ferrule connected to the radial swirler, the ferrule configured to center the fuel nozzle in the radial swirler; and a surface feature comprising a plurality of grooves, the surface feature being located on an axially facing forward surface of the second wall and configured to direct a primary air flow through the primary air passage away from a recirculation zone located upstream of the primary swirler vane, wherein each groove of the plurality of grooves extend radially from a radially inner surface to a radially outer surface.

10. The swirler-ferrule assembly of claim 9, further comprising a lip having a venturi surface, the lip extending between the primary swirler vane and the secondary swirler vane.

11. The swirler-ferrule assembly of claim 9, wherein the plurality of grooves are semi-circular.

12. The swirler-ferrule assembly of claim 9, further comprising a second surface feature on an axially facing aft surface of the ferrule, the surface feature being located on the axially facing aft surface.

13. The swirler-ferrule assembly of claim 9, wherein the plurality of grooves are oriented in a tangential direction from the radially inner surface to the radially outer surface.

14. The swirler-ferrule assembly of claim 13, wherein the surface feature further comprising an annular gap between a first radially inner surface of the second wall and a second radially inner surface at which the plurality of grooves begin.

15. The swirler-ferrule assembly of claim 9, further comprising a lip extending from the second wall, wherein the lip is configured to deflect an air flow from the ferrule away from the primary air flow.

16. The swirler-ferrule assembly of claim 15, the lip extending radially inward from a second wall inner diameter and ending radially outward of a ferrule inner diameter.

17. The swirler-ferrule assembly of claim 15, further comprising a plurality of purge air passages, wherein each purge air passage of the plurality of purge air passages includes an axial portion defined in the ferrule and a tangential portion defined between the lip and an outer surface of the fuel nozzle.

18. The swirler-ferrule assembly of claim 9, further comprising a lip extending from the primary swirler vane, wherein the lip is configured to deflect an air flow from the ferrule away from the primary air flow.

19. The swirler-ferrule assembly of claim 18, further comprising a plurality of purge air passages, wherein each purge air passage of the plurality of purge air passages includes an axial portion defined in the ferrule and a tangential portion or a radial portion defined between the lip and an outer surface of the fuel nozzle.

* * * * *